United States Patent
Kurita et al.

(10) Patent No.: US 7,378,841 B2
(45) Date of Patent: May 27, 2008

(54) ROTATION ANGLE DETECTING APPARATUS

(75) Inventors: Kazuhisa Kurita, Tokyo (JP); Yoshihiko Onishi, Tokyo (JP); Takuya Uryu, Tokyo (JP); Manabu Miyaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/337,532

(22) Filed: Jan. 24, 2006

(65) Prior Publication Data

US 2007/0090829 A1 Apr. 26, 2007

(30) Foreign Application Priority Data

Oct. 20, 2005 (JP) ............................ 2005-305709

(51) Int. Cl.
*G01B 7/30* (2006.01)

(52) U.S. Cl. ................................................ 324/207.25

(58) Field of Classification Search ........... 324/207.25, 324/207.13, 207.2, 207.21–207.23, 234–235, 324/244, 251, 173–174, 252; 73/514.31, 73/514.39; 123/612, 617
See application file for complete search history.

(56) References Cited

U.S. PATENT DOCUMENTS 4,392,375 A * 7/1983 Eguchi et al. ............. 73/118.1
5,055,781 A * 10/1991 Sakakibara et al. ..... 324/207.21
6,930,477 B1   8/2005 Kurita et al.

FOREIGN PATENT DOCUMENTS

| DE | 10 2004 031 664 A1 | 9/2005 |
|---|---|---|
| JP | 11-094512 A | 4/1999 |
| JP | 2001-317909 | 11/2001 |
| JP | 2005-233768 | 9/2005 |

* cited by examiner

*Primary Examiner*—Reena Aurora
(74) *Attorney, Agent, or Firm*—Sughrue Mion, PLLC

(57) ABSTRACT

A rotation angle detecting apparatus includes: a first permanent magnet; a second permanent magnet disposed so as to face the first permanent magnet, the second permanent magnet rotating together with a shaft; an arc-shaped first magnetic member and second magnetic member fixed to the first permanent magnet and the second permanent magnet; and a magnetic resistor disposed in an air gap formed between the first magnetic member and the second magnetic member so as to be axially aligned with the shaft, the first magnetic member and the second magnetic member each including: a projecting portion pointed at the magnetic resistor; and a wall portion surrounding the magnetic resistor so as to prevent influence from external magnetic fields.

8 Claims, 9 Drawing Sheets

ROTATION ANGLE DETECTING APPARATUS

BACKGROUND OF THE INVENTION

1. Field of the Invention

The present invention relates to a rotation angle detecting apparatus for detecting a rotation angle of a detected body using a magnetic resistor and a permanent magnet.

2. Description of the Related Art

Conventionally, known examples of rotation angle detecting apparatuses include those in which permanent magnets are mounted to an end portion of a rotating shaft, a magnetoresistive sensor is disposed so as to be axially aligned with the rotating shaft and so as to be separated from the permanent magnets and perpendicular to the rotating shaft, and a rotation angle of the rotating shaft is detected by the magnetoresistive sensor responding to magnetic flux originating from the permanent magnets in a direction perpendicular to the rotating shaft (See Patent Literature 1, for example).

Patent Literature 1

Japanese Patent Laid-Open No. HEI 11-94512 (Gazette)

In the above rotation angle detecting apparatus, one problem has been that much of the magnetic flux originating from the permanent magnets leaks outside a region to which the magnetoresistive sensor responds, requiring larger permanent magnets and increasing costs.

SUMMARY OF THE INVENTION

The present invention aims to solve the above problems and an object of the present invention is to provide a rotation angle detecting apparatus enabling permanent magnets to be reduced in size by a simple construction to reduce costs and also reduce external influences on magnetic flux.

In order to achieve the above object, according to one aspect of the present invention, there is provided a rotation angle detecting apparatus including: a first permanent magnet rotating together with a rotator; a second permanent magnet disposed so as to face the first permanent magnet, the second permanent magnet also rotating together with the rotator; an arc-shaped first magnetic member having two end surfaces fixed to South-seeking (S) pole sides of the first permanent magnet and the second permanent magnet, respectively; an arc-shaped second magnetic member having two end surfaces fixed to North-seeking (N) pole sides of the first permanent magnet and the second permanent magnet, respectively, the arc-shaped second magnetic member facing the first magnetic member; and a magnetic resistor disposed in an air gap formed between the first magnetic member and the second magnetic member so as to be axially aligned with the rotator and fixed to a non-rotator, the first magnetic member and the second magnetic member each including: a projecting portion pointed at the magnetic resistor; and a wall portion surrounding the magnetic resistor so as to prevent influence from external magnetic fields, and the magnetic resistor detecting a rotation angle of the rotator by detecting a change in orientation of magnetic flux arising in the first permanent magnet and the second permanent magnet in the air gap.

In a rotation angle detecting apparatus according to the present invention, magnetic flux originating in the permanent magnets is guided by the first magnetic member and the second magnetic member so as to pass through the magnetic resistor, reducing leakage of the magnetic flux to regions other than the magnetic resistor, and enabling the permanent magnets to be reduced in size proportionately.

Because the magnetic resistor is surrounded by the wall portions of the first magnetic member and the second magnetic member, influence on the magnetic resistor from external magnetic fields is reduced.

DETAILED DESCRIPTION OF THE PREFERRED EMBODIMENTS

Figure 1:
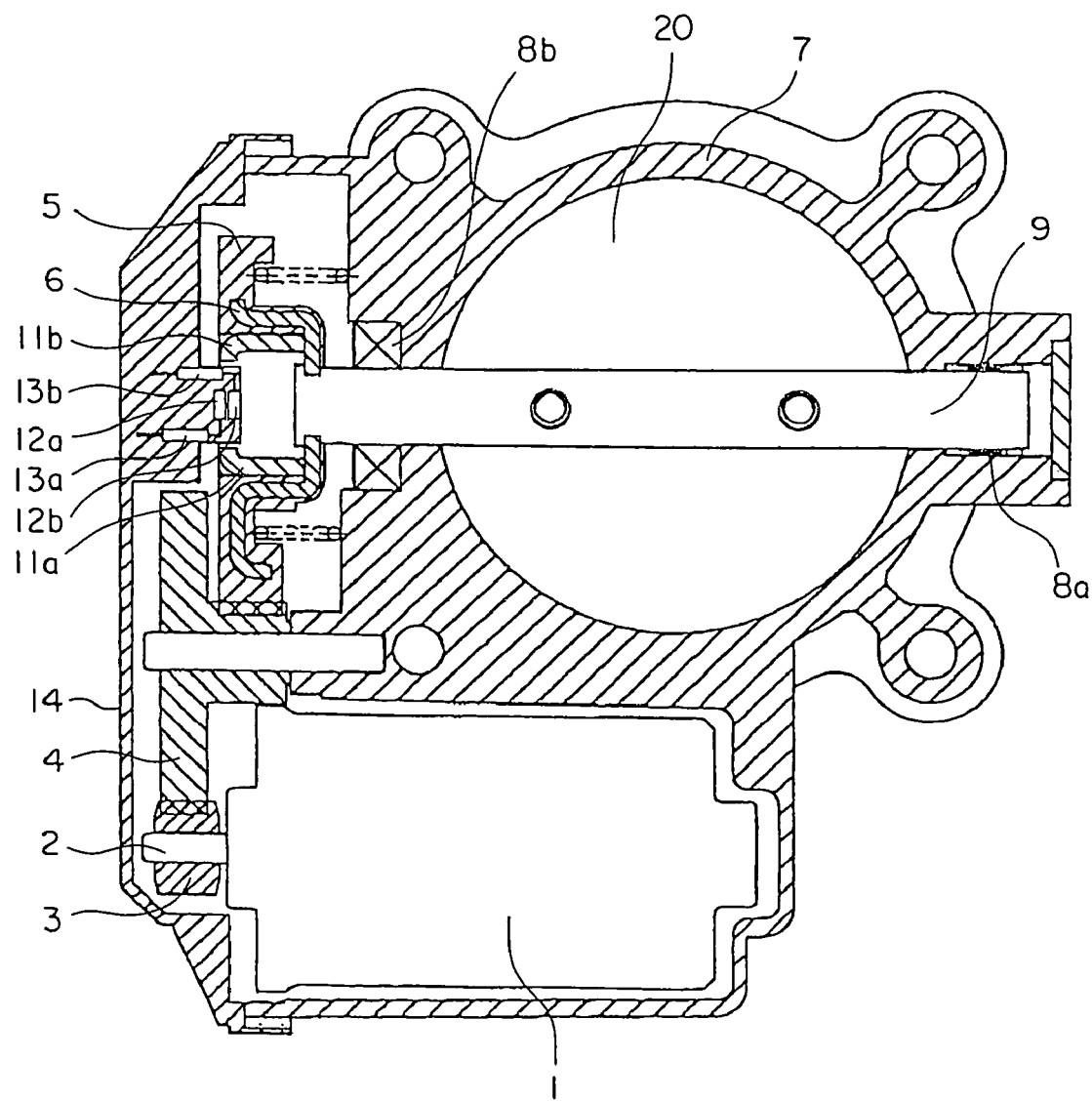
FIG. 1 is a cross section showing an engine air intake control apparatus incorporating a rotation angle detecting apparatus according to Embodiment 1 of the present invention.

Preferred embodiments of the present invention will now be explained based on drawings, and identical or corresponding members and portions in the drawings will be given identical numbering.

Embodiment 1

Figure 2:
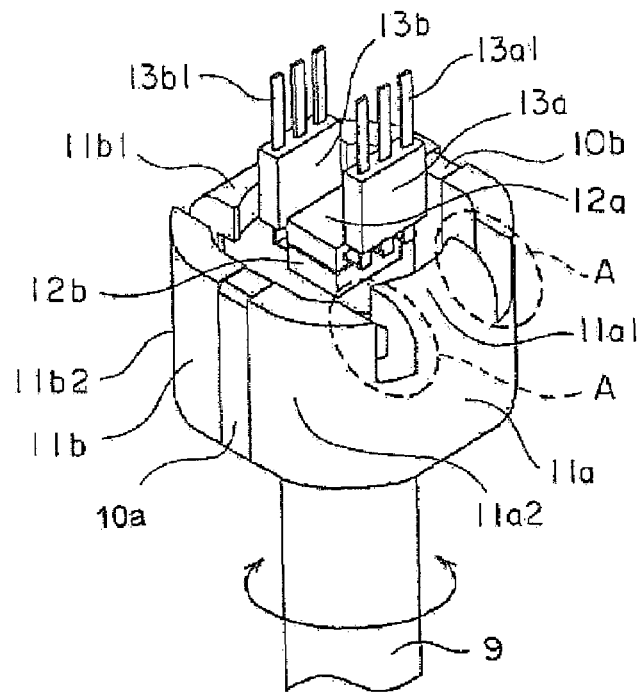
FIG. 2 is a perspective of the rotation angle detecting apparatus shown in FIG. 1.
Figure 3:
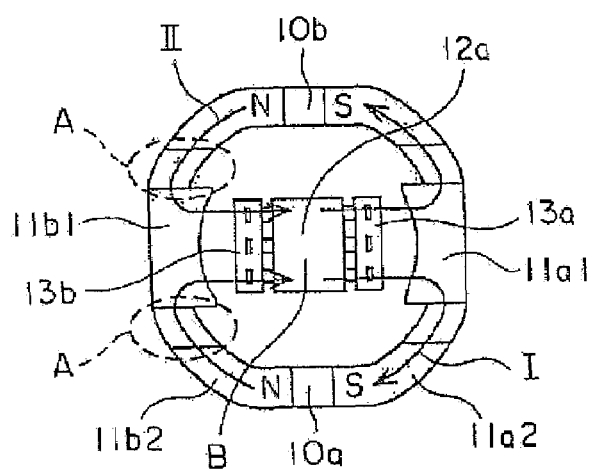
FIG. 3 is a plan of FIG. 2.
Figure 4:
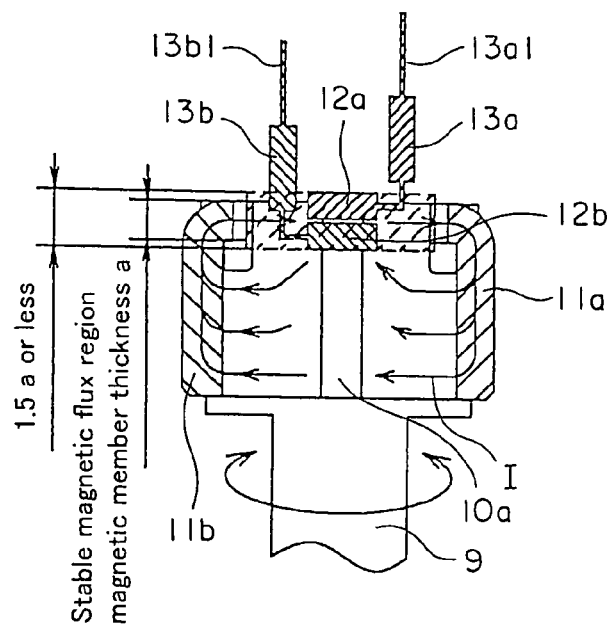
FIG. 4 is a cross section of FIG. 2.

FIG. 1 is a cross section showing an engine air intake control apparatus (hereinafter simply "air intake control apparatus") incorporating a rotation angle detecting apparatus according to Embodiment 1, FIG. 2 is a perspective of the rotation angle detecting apparatus shown in FIG. 1, FIG. 3 is a plan of FIG. 2, and FIG. 4 is a cross section of FIG. 2.

In an air intake control apparatus, a motor spur gear 3 is fixed to a shaft 2 of a drive motor 1 driven by direct current. A resin intermediate gear 4 intermeshes with the motor spur gear 3. A fan-shaped resin final spur gear 5 intermeshes with the intermediate gear 4. A cup-shaped insert member 6 made of a nonmagnetic material is embedded in the final spur gear 5. The insert member 6 is fixed to an end portion of a shaft 9 constituting a rotator. The shaft 9 is supported by a first bearing 8a and a second bearing 8b so as to be rotatable relative to a body 7. A throttle valve 20 is fixed to the shaft 9.

The insert member 6 and the final spur gear 5, and a first magnetic member 11a, a second magnetic member 11b, a first permanent magnet 10a, and a second permanent magnet 10b are integrated.

The first permanent magnet 10a and the second permanent magnet 10b are disposed so as to face each other. Two end surfaces of the arc-shaped first magnetic member 11a are fixed to South-seeking (S) pole sides of the first permanent magnet 10a and the second permanent magnet 10b, respectively. The arc-shaped second magnetic member 11b facing the first magnetic member 11a is fixed to North-seeking (N) pole sides of the first permanent magnet 10a and the second permanent magnet 10b, respectively.

In an air gap B formed between the first magnetic member 11a and the second magnetic member 11b, a first magnetic resistor 12a and a second magnetic resistor 12b are stacked so as to be axially aligned with the shaft 9 and so as to be spaced apart axially at a center of the air gap B. The first magnetic resistor 12a and the second magnetic resistor 12b are disposed as a pair so as to function as a fail safe, and are connected to a first operation circuit member 13a and a second operation circuit member 13b, respectively. The first magnetic resistor 12a, the second magnetic resistor 12b, the first operation circuit member 13a, and the second operation circuit member 13b are integrated in a housing 14 by insertion molding. The housing 14 is fixed to the body 7, and covers the motor spur gear 3, the intermediate gear 4, and the final spur gear 5.

The first magnetic member 11a and the second magnetic member 11b include: first and second projecting portions 11a1 and 11b1 pointed at the first magnetic resistor 12a and the second magnetic resistor 12b, respectively; and first and second wall portions 11a2 and 11b2 surrounding the magnetic resistors 12a and 12b and preventing influence from external magnetic fields. Notched portions A are formed on two sides of the projecting portions 11a1 and 11b1, respectively.

As shown in FIG. 4, the first magnetic resistor 12a and the second magnetic resistor 12b are disposed within less than or equal to 1.5 times a height of the air gap B relative to a thickness a of the magnetic members 11a and 11b in an axial direction of the shaft 9.

Moreover, a rotation angle detecting apparatus is constituted by the first permanent magnet 10a, the second permanent magnet 10b, the first magnetic member 11a, the second magnetic member 11b, the first magnetic resistor 12a, the second magnetic resistor 12b, the first operation circuit member 13a, and the second operation circuit member 13b.

In this rotation angle detecting apparatus, as shown in FIGS. 3 and 4, magnetic flux originating from the first permanent magnet 10a flows in the direction of arrow I (clockwise in FIG. 3), specifically, along a magnetic circuit pathway formed by the North-seeking (N) pole of the first permanent magnet 10a, the wall portion 11b2 and projecting portion 11b1 of the second magnetic member 11b, the air gap B, the projecting portion 11a1 and the wall portion 11a2 of the first magnetic member 11a, and the South-seeking (S) pole of the first permanent magnet 10a.

Magnetic flux originating from the second permanent magnet 10b flows in the direction of arrow II (counter-clockwise in FIG. 3), specifically, along a magnetic circuit pathway formed by the North-seeking (N) pole of the second permanent magnet 10b, the wall portion 11b2 and projecting portion 11b1 of the second magnetic member 11b, the air gap B, the projecting portion 11a1 and the wall portion 11a2 of the first magnetic member 11a, and the South-seeking (S) pole of the second permanent magnet 10b.

In an air intake control apparatus having the above configuration, when a driver depresses an accelerator pedal, accelerator opening degree signals from an accelerator opening degree sensor (not shown) are input into an engine control apparatus (hereinafter "ECU"). The drive motor 1 is energized by the ECU to rotate the shaft 2 of the drive motor 1 such that the throttle valve 20 is opened to a predetermined opening degree. Then, because the shaft 2 rotates, the intermediate gear 4 and the final spur gear 5 also rotate. Thus, the shaft 9 integrated with the final spur gear 5 rotates to a predetermined rotation angle, and the throttle valve 20 is held at the predetermined rotation angle inside an air intake passage formed in the body 7.

At the same time, the first magnetic resistor 12a and the second magnetic resistor 12b, which constitute a magnetic flux orientation detecting system, detect orientation of the magnetic flux from the first permanent magnet 10a and the second permanent magnet 10b, which rotate integrally with the shaft 9, and output signals from the first magnetic resistor 12a and the second magnetic resistor 12b are processed by the first operation circuit member 13a and the second operation circuit member 13b and then sent through the output terminals 13a1 and 13b1 to the ECU as opening degree signals for the throttle valve 20.

The ECU uses these opening degree signals to decide how much fuel to inject inside cylinders. The range of change in magnetic flux orientation that the first magnetic resistor 12a and the second magnetic resistor 12b can handle is a range from 0 degrees when the throttle valve 20 is fully closed to 90 degrees when fully open, and the first magnetic resistor 12a and the second magnetic resistor 12b each respond linearly within this range.

As explained above, in a rotation angle detecting apparatus according to this embodiment, because a large portion of the magnetic flux originating in the first permanent magnet 10a and the second permanent magnet 10b passes through the first and second magnetic resistors 12a and 12b without leaking externally, it is not necessary for the permanent magnets 10 to be made unnecessarily large, enabling reductions in size and cost. The influence of magnetic flux leakage on parts in the vicinity is also suppressed.

Because the wall portions 11a1 and 11a2 of the first magnetic member 11a and the second magnetic member 11b surround the first magnetic resistor 12a and the second magnetic resistor 12b, the influence of external magnetic fields on the first magnetic resistor 12a and the second magnetic resistor 12b is reduced.

The center of the air gap B between the facing projecting portions 11a1 and 11b1 is aligned with the central axis of the shaft 9, and the first magnetic resistor 12a and the second magnetic resistor 12b are disposed within less than or equal to 1.5 times the height of the air gap B relative to the thickness a of the magnetic members 11a and 11b.

This value 1.5 is a boundary value for achieving stable flow in the magnetic flux and was obtained by the present inventors using magnetic analysis.

Consequently, because the first magnetic resistor 12a and the second magnetic resistor 12b are disposed within the air gap B, it is possible to perform detection within a stable flow of magnetic flux.

The first magnetic member 11a and the second magnetic member 11b are produced by pressing magnetic steel sheets and since the wall portions 11a1 and 11a2 and the projecting portions 11a1 and 11b1 require bending and are small, configurational difficulties arise in machining these parts, but bending can be made comparatively easy by forming the notched portions A on the two sides of the projecting portions 11a1 and 11b1.

Embodiment 2

Figure 5:
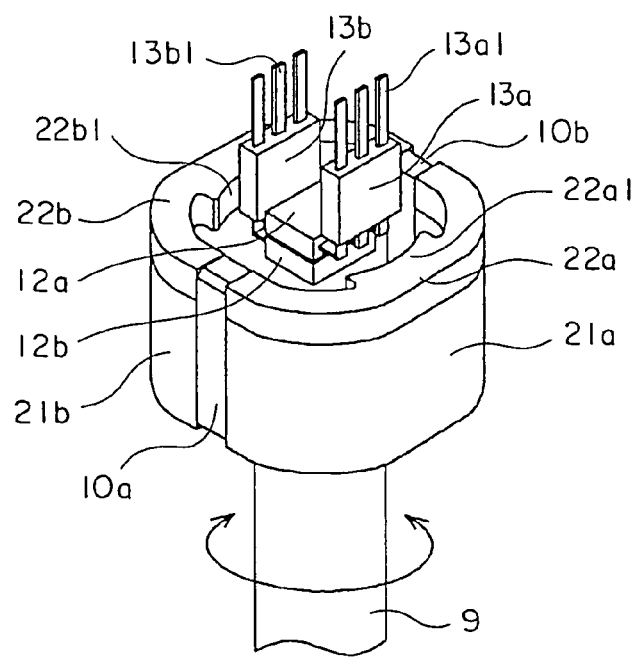
FIG. 5 is a perspective showing a rotation angle detecting apparatus according to Embodiment 2 of the present invention.
Figure 6:
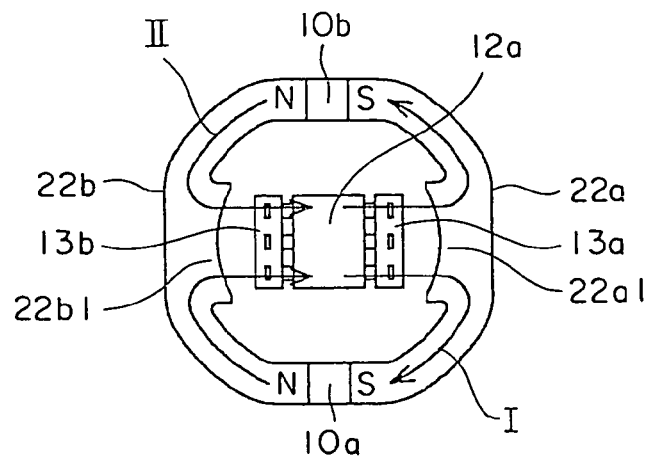
FIG. 6 is a plan of FIG. 5.
Figure 7:
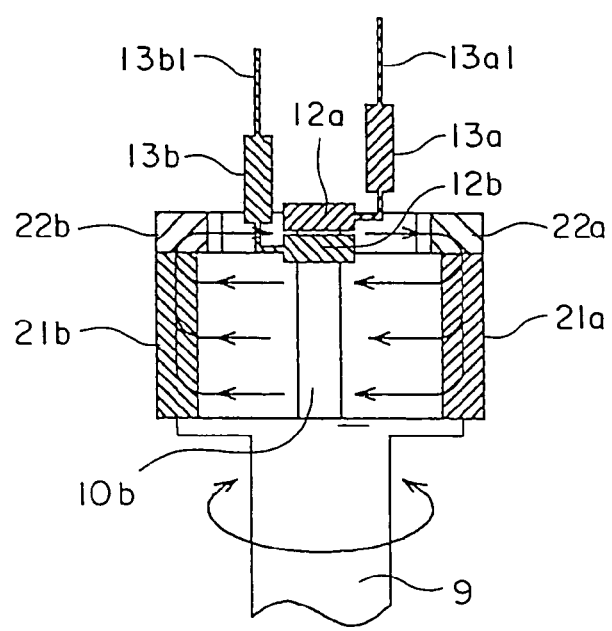
FIG. 7 is a cross section of FIG. 5.
Figure 8:
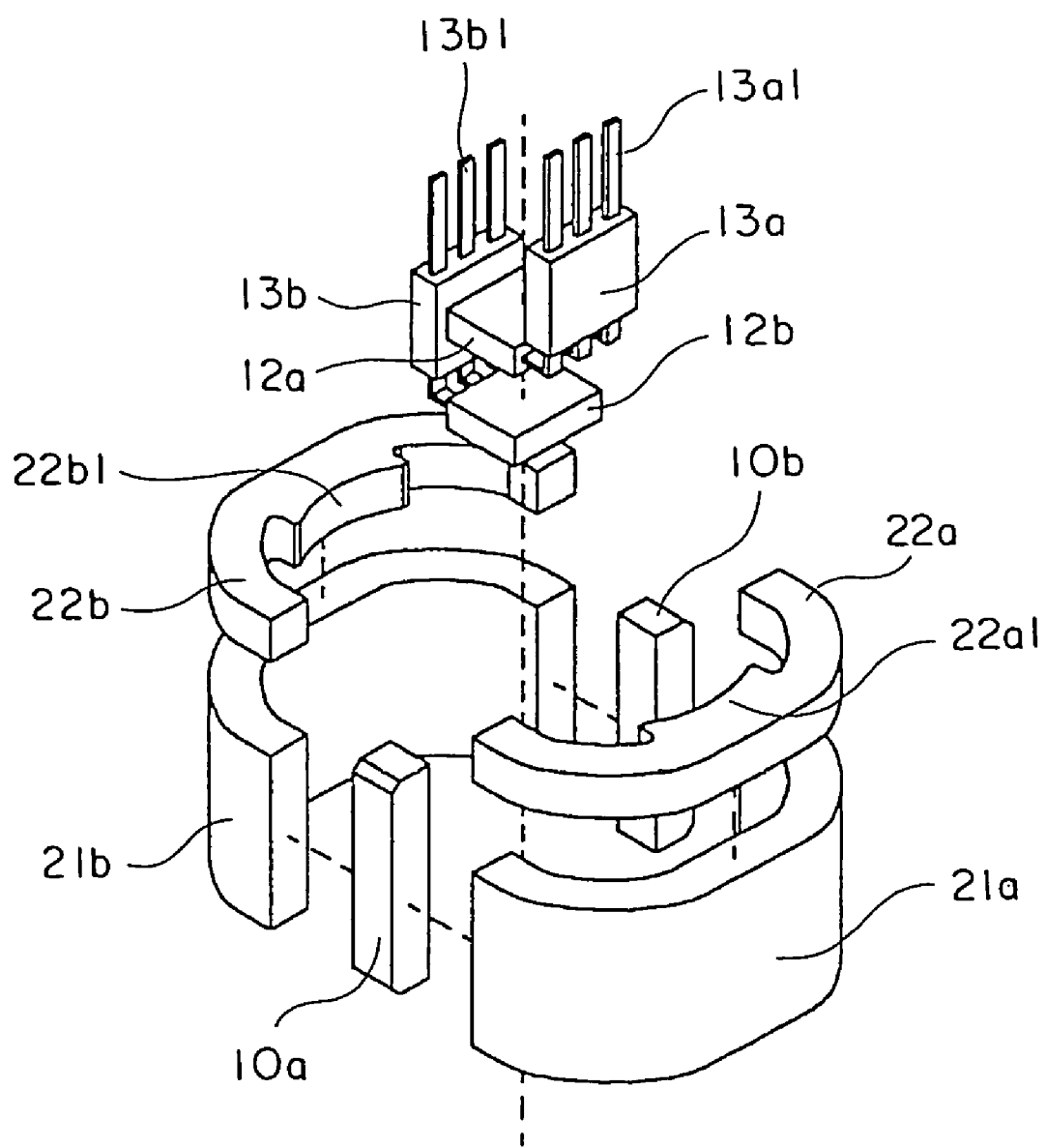
FIG. 8 is an exploded perspective of the rotation angle detecting apparatus in FIG. 6.

FIG. 5 is a perspective showing a rotation angle detecting apparatus according to Embodiment 2 of the present invention, FIG. 6 is a plan of FIG. 5, FIG. 7 is a cross section of FIG. 5, and FIG. 8 is an exploded perspective of the rotation angle detecting apparatus in FIG. 6.

In this embodiment, two end surfaces of an arc-shaped first wall member 21a are fixed to South-seeking (S) pole sides of a first permanent magnet 10a and a second permanent magnet 10b, respectively. Two end surfaces of an arc-shaped second wall member 21b are fixed to North-seeking (N) pole sides of the first permanent magnet 10a and the second permanent magnet 10b, respectively.

An arc-shaped first guiding member 22a is stacked on and fixed to the first wall member 21a. A projecting portion 22a1 pointed at the first magnetic resistor 12a and the second magnetic resistor 12b is formed on an intermediate portion of the first guiding member 22a.

An arc-shaped second guiding member 22b is stacked on and fixed to the second wall member 21b. A projecting portion 22b1 pointed at the first magnetic resistor 12a and the second magnetic resistor 12b is formed on an intermediate portion of the second guiding member 22b.

The rest of the configuration is similar to that of Embodiment 1.

Whereas in Embodiment 1 various machining processes such as punching, bending, grinding, etc., are required for the first magnetic member 11a and the second magnetic member 11b, and increased man-hours and increased costs are of concern, in this embodiment, the number of processes is reduced by dividing the wall members 21a and 21b and the guiding members 22a and 22b into separate members, reducing costs.

In Embodiment 1, notched portions A are formed in order to facilitate bendability, but these notched portions A constitute penetrating passages for external magnetic flux, and are not desirable in that respect.

In contrast to that, the need for notched portions A is eliminated in Embodiment 2, enabling the influence of external magnetic fields on the first magnetic resistor 12a and the second magnetic resistor 12b to be further reduced compared to Embodiment 1.

Moreover, in the above embodiment, identical magnetic steel sheets are used for the wall members 21a and 21b and the guiding members 22a and 22b even though they differ in function, the guiding members 22a and 22b being mainly flux paths and the wall members 21a and 21b mainly reducing the influence of external magnetic fields.

Consequently, magnetic resistance can be further reduced in the magnetic circuit by using a material for the guiding members 22a and 22b that has superior magnetic properties compared to the wall member 21a and 21b.

Embodiment 3

Figure 9:
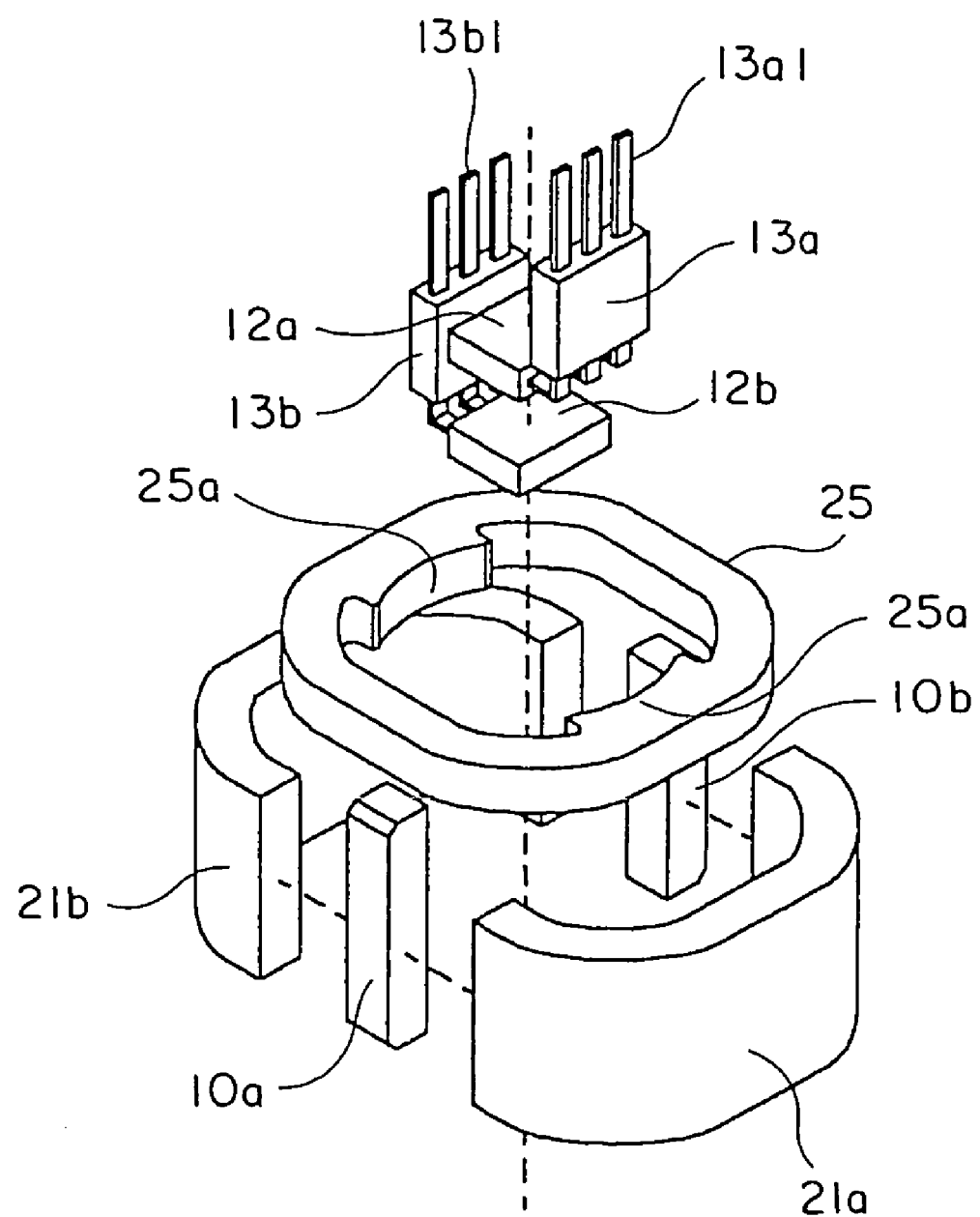
FIG. 9 is an exploded perspective showing a rotation angle detecting apparatus according to Embodiment 3 of the present invention.
Figure 10:
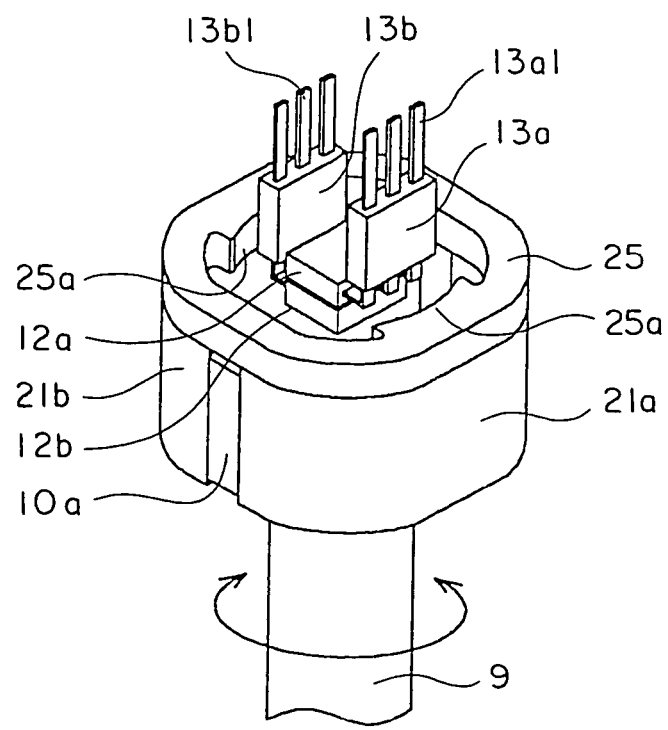
FIG. 10 is a perspective of the rotation angle detecting apparatus in FIG. 9.
Figure 11:
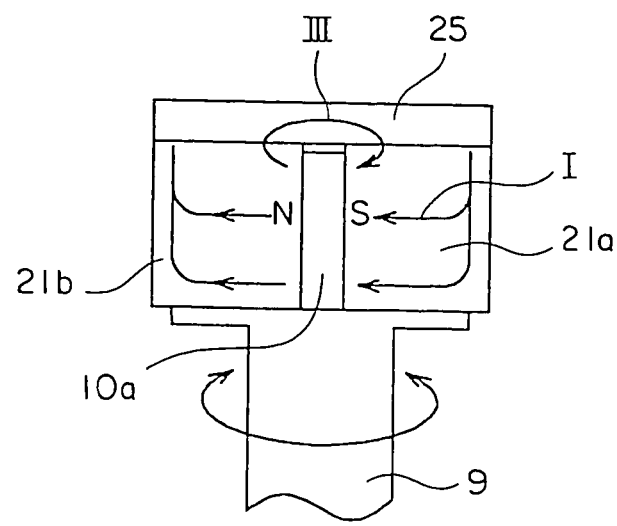
FIG. 11 is a side elevation of FIG. 10.

FIG. 9 is an exploded perspective showing a rotation angle detecting apparatus according to Embodiment 3 of the present invention, FIG. 10 is a perspective of the rotation angle detecting apparatus in FIG. 9, and FIG. 11 is a side elevation of FIG. 10.

In this embodiment, a first guiding member 22a and a second guiding member 22b are linked so as to be constituted by an integrated ring member 25.

The rest of the configuration is similar to that of Embodiment 2.

In Embodiment 2, misalignment may occur during mounting of the first guiding member 22a or the second guiding member 22b, and there is a risk that they may be mounted in a state in which their respective central axes are not aligned.

In contrast to that, since the ring member 25 is integrated in this configuration, such problems do not arise. Furthermore, the number of parts is reduced, and the above assembly man-hours are also eliminated, reducing costs.

Embodiment 4

Figure 12:
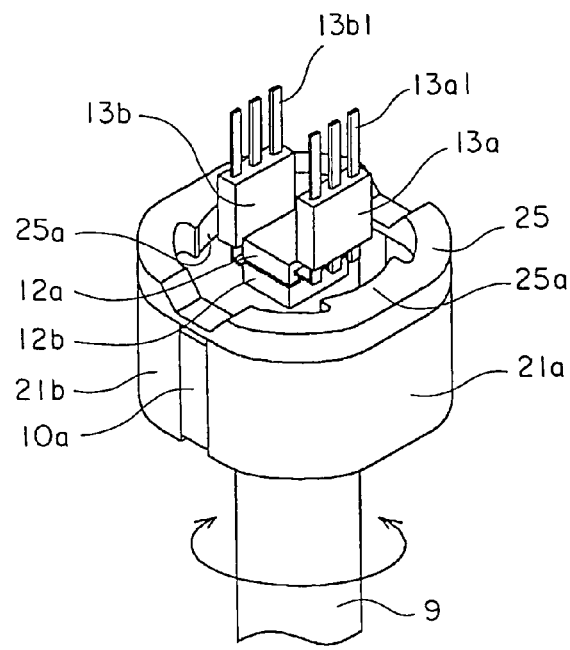
FIG. 12 is a perspective showing a rotation angle detecting apparatus according to Embodiment 4 of the present invention.
Figure 13:
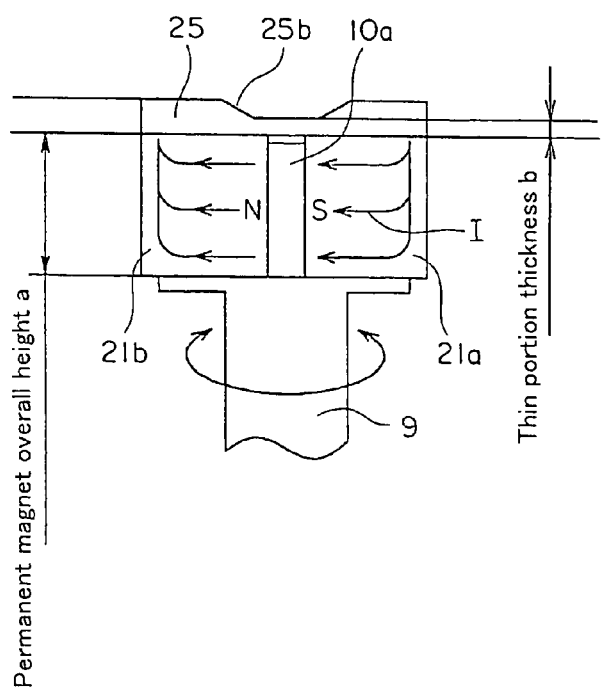
FIG. 13 is a side elevation of FIG. 12.

FIG. 12 is a perspective showing a rotation angle detecting apparatus according to Embodiment 4 of the present invention, and FIG. 13 is a side elevation of FIG. 12.

In this embodiment, a ring member 25 is formed so as to have thin portions 25b at positions coming into contact with a first permanent magnet 10a and a second permanent magnet 10b.

The rest of the configuration is similar to that of Embodiment 3.

In Embodiment 2, the first guiding member 22a and the second guiding member 22b are disposed on mutually opposite sides of the first permanent magnet 10a and the second permanent magnet 10b, and magnetic flux flows as indicated by arrows I and II in FIG. 6.

However, in Embodiment 3, the first guiding member 22a and the second guiding member 22b are constituted by a ring member 25 and a portion of the magnetic flux from the first permanent magnet 10a and the second permanent magnet 10b flows straight through, as indicated by arrow III (see FIG. 11), reducing the amount of magnetic flux flowing through the first magnetic resistor 12a and the second magnetic resistor 12b.

In contrast to that, the amount of magnetic flux leakage flowing in the direction of arrow III is reduced in this configuration by forming the thin portions 25b on the ring member 25.

The present inventors found a relationship between the thickness at the thin portions 25b and the magnetic flux density required by the first magnetic resistor 12a and the second magnetic resistor 12b using magnetic analysis.

Figure 14:
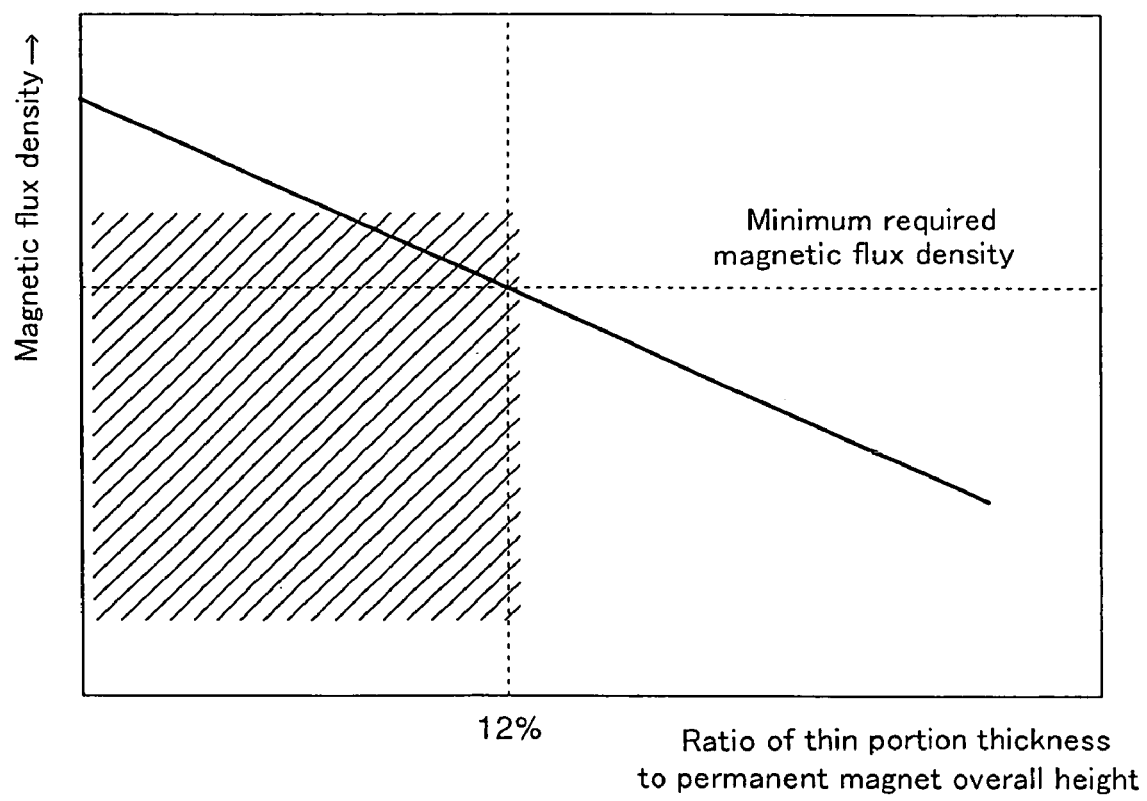
FIG. 14 is a graph showing a relationship between a ratio of thin portion thickness to permanent magnet overall height and magnetic flux density in an air gap.

FIG. 14 is a graph showing the results of that analysis.

As can be seen from the graph, it was found that the required magnetic flux density is achieved in the first magnetic resistor 12a and the second magnetic resistor 12b if the ratio of the thickness b of the thin portions 25b to the overall height a of the permanent magnets 10a and 10b is less than or equal to 12 percent.

Consequently, by making the ratio of the thickness b of the thin portions 25b relative to the overall height a of the permanent magnets 10a and 10b less than or equal to 12 percent, it is possible to ensure the effects resulting from using the ring member 25 and also reliably detect the rotation angle of the shaft 9.

Moreover, the rotation angle detecting apparatus in each of the preferred embodiments has been explained as being installed in an engine air intake control apparatus for detecting the degree of opening of a throttle valve, but of course the present invention can also be applied to any other kind of apparatus for detecting the rotation angle of a rotator.

What is claimed is:

1. A rotation angle detecting apparatus comprising:
a first permanent magnet rotating together with a rotator;
a second permanent magnet disposed so as to face said first permanent magnet, said second permanent magnet also rotating together with said rotator;
an arc-shaped first magnetic member having two end surfaces fixed to South-seeking (S) pole sides of said first permanent magnet and said second permanent magnet, respectively;
an arc-shaped second magnetic member having two end surfaces fixed to North-seeking (N) pole sides of said first permanent magnet and said second permanent magnet, respectively, said arc-shaped second magnetic member facing said first magnetic member; and
a magnetic resistor disposed in an air gap formed between said first magnetic member and said second magnetic member so as to be axially aligned with said rotator and fixed to a non-rotator, said first magnetic member and said second magnetic member each comprising:
a first wall portion having a tip end projected toward said magnetic resistor; and
second and third wall portions surrounding said magnetic resistor so as to prevent influence from external magnetic fields,
wherein said second and third wall portions are disposed between said first permanent magnet and said first wall portion, and said second permanent magnet and said first wall portion, respectively,
wherein heights of said first, second and third wall portions in an axial direction are substantially same, and
said magnetic resistor detecting a rotation angle of said rotator by detecting a change in orientation of magnetic flux arising in said first permanent magnet and said second permanent magnet in said air gap.

2. The rotation angle detecting apparatus according to claim 1, wherein:
notched portions are formed on said first magnetic member and said second magnetic member on two sides of each of said projecting portions.

3. The rotation angle detecting apparatus according to claim 1, wherein:
said rotator is a shaft fixed to a throttle valve for adjusting a degree of opening inside an air intake passage; and
said non-rotator is a housing fixed to a body in which said throttle valve is housed.

4. The rotation angle detecting apparatus according to claim 3, wherein:
said magnetic resistor is integrated into said housing by insertion molding.

5. A rotation angle detecting apparatus comprising:
a first permanent magnet rotating together with a rotator;
a second permanent magnet disposed so as to face said first permanent magnet, said second permanent magnet also rotating together with said rotator;
an arc-shaped first wall member having two end surfaces fixed to South-seeking (S) pole sides of said first permanent magnet and said second permanent magnet, respectively;
an arc-shaped second wall member having two end surfaces fixed to North-seeking (N) pole sides of said first permanent magnet and said second permanent magnet, respectively, said arc-shaped second wall member facing said first wall member;
a magnetic resistor disposed so as to be axially aligned with said rotator and fixed to a non-rotator;
a first guiding member stacked on and fixed to said first wall member, said first guiding member constituting a passage for magnetic flux originating in said first permanent magnet and said second permanent magnet and having a projecting portion pointed at said magnetic resistor; and
a second guiding member stacked on and fixed to said second wall member, said second guiding member constituting a passage for magnetic flux originating in said first permanent magnet and said second permanent magnet and having a projecting portion pointed at said magnetic resistor,
said first wall member and said second wall member surrounding said magnetic resistor so as to prevent influence from external magnetic fields, and
said magnetic resistor detecting a rotation angle of said rotator by detecting a change in orientation of magnetic flux arising in said first permanent magnet and said second permanent magnet.

6. The rotation angle detecting apparatus according to claim 5, wherein:
said first guiding member and said second guiding member have superior magnetic properties compared to said first wall member and said second wall member.

7. The rotation angle detecting apparatus according to claim 5, wherein:
said first guiding member and said second guiding member are linked and integrated into a ring member.

8. The rotation angle detecting apparatus according to claim 7, wherein:
a thickness of said ring member is made thinner than a thickness of said projecting portion at portions coming into contact with said first permanent magnet and said second permanent magnet.

* * * * *